United States Patent

Tomich et al.

(10) Patent No.: US 8,884,806 B2
(45) Date of Patent: Nov. 11, 2014

(54) SUBTERRANEAN RADAR SYSTEM AND METHOD

(75) Inventors: John Louis Tomich, Coppell, TX (US); Raymond Samaniego, Prosper, TX (US); Jerry Michael Grimm, Plano, TX (US); Leslie Alexander Priebe, Plano, TX (US); Hyong Eall Bang, Atlanta, GA (US)

(73) Assignee: Raytheon Company, Waltham, MA (US)

( * ) Notice: Subject to any disclaimer, the term of this patent is extended or adjusted under 35 U.S.C. 154(b) by 471 days.

(21) Appl. No.: 13/281,736

(22) Filed: Oct. 26, 2011

(65) Prior Publication Data

US 2013/0106642 A1    May 2, 2013

(51) Int. Cl.
*G01S 13/88* (2006.01)
*G01S 13/00* (2006.01)
*G01S 13/87* (2006.01)
*G01S 13/02* (2006.01)

(52) U.S. Cl.
CPC .......... *G01S 13/003* (2013.01); *G01S 13/0218* (2013.01); *G01S 13/878* (2013.01); *G01S 13/885* (2013.01)
USPC .............................. 342/22; 342/179; 342/180

(58) Field of Classification Search
CPC ... G01S 13/885; G01S 13/003; G01S 13/887; G01S 13/89; G01S 13/0218; G01S 13/878
USPC ...................... 342/22, 27, 179–180
See application file for complete search history.

(56) References Cited

U.S. PATENT DOCUMENTS

| 5,383,457 | A | 1/1995 | Cohen |
| 5,394,151 | A | 2/1995 | Knaell et al. |
| 6,864,826 | B1 * | 3/2005 | Stove ............................. 342/22 |
| 7,207,943 | B2 | 4/2007 | Barnes et al. |
| 7,215,277 | B2 | 5/2007 | Woodford et al. |
| 7,804,441 | B1 * | 9/2010 | DeChiaro, Jr. .................. 342/22 |
| 7,864,101 | B2 | 1/2011 | Samaniego et al. |
| 7,898,468 | B2 | 3/2011 | Samaniego et al. |
| 8,026,844 | B2 * | 9/2011 | Fox et al. ...................... 342/173 |
| 8,174,430 | B1 * | 5/2012 | DeChiaro, Jr. .................. 342/22 |
| 8,711,028 | B2 * | 4/2014 | Paglieroni et al. ............. 342/22 |
| 8,717,223 | B2 * | 5/2014 | Chambers et al. ............. 342/22 |
| 8,730,085 | B2 * | 5/2014 | Paglieroni et al. ............. 342/22 |
| 8,754,802 | B2 * | 6/2014 | Paglieroni et al. ............. 342/22 |
| 8,786,485 | B2 * | 7/2014 | Atkins et al. ................... 342/22 |

(Continued)

OTHER PUBLICATIONS

Anderson, Michael D., "Resolution in Radar Mapping," Master's Thesis, Mar. 1, 1993, retrieved from the internet: http://www.dtic.mil/cgi-bin/GetTRDoc?AD=ADA69730 (retrieved on Oct. 8, 2013), 90 pages.

(Continued)

*Primary Examiner* — John B Sotomayor
(74) *Attorney, Agent, or Firm* — Lando & Anastasi, LLP

(57) ABSTRACT

A subterranean radar array system and method for imaging a subterranean target area. In one example, the subterranean radar array includes a plurality of radar chains disposed in a plurality of underground columns, each radar chain including a plurality of radar units forming the plurality of radar chains and at least one processor coupled to a corresponding at least one of the plurality of radar chains and configured to generate an image of a subterranean target area from signals received from the at least one radar chain.

16 Claims, 6 Drawing Sheets

(56) References Cited

U.S. PATENT DOCUMENTS

| | | | |
|---|---|---|---|
| 2005/0061547 A1* | 3/2005 | Wilson-Langman et al. | 175/40 |
| 2005/0285772 A1* | 12/2005 | Basir et al. | 342/22 |
| 2006/0238401 A1* | 10/2006 | Wuersch et al. | 342/22 |
| 2008/0062036 A1* | 3/2008 | Funk et al. | 342/22 |
| 2010/0214150 A1* | 8/2010 | Lovberg et al. | 342/22 |
| 2011/0012777 A1 | 1/2011 | Tomich et al. | |
| 2011/0148691 A1 | 6/2011 | Samaniego et al. | |
| 2011/0227777 A1* | 9/2011 | Lee et al. | 342/22 |
| 2011/0304495 A1* | 12/2011 | Bausov et al. | 342/22 |
| 2012/0262324 A1* | 10/2012 | Samaniego et al. | 342/22 |
| 2012/0268307 A1* | 10/2012 | Tomich et al. | 342/22 |
| 2013/0082860 A1* | 4/2013 | Paglieroni et al. | 342/22 |
| 2013/0082861 A1* | 4/2013 | Paglieroni et al. | 342/22 |
| 2013/0082862 A1* | 4/2013 | Paglieroni et al. | 342/22 |
| 2013/0106642 A1* | 5/2013 | Tomich et al. | 342/22 |

OTHER PUBLICATIONS

Kragh, Thomas J., "Minimum-Entropy Autofocus for Three-Dimensional SAR Imaging," Proc. of SPIE vol. 7337, Algorithms for Synthetic Aperture Radar Imagery XVI, Apr. 28, 2009, 11 pages.

Tomich, et al., "Systems and Methods for Mapping the Crust of the Earth", co-pending U.S. Appl. No. 13/089,720, filed Apr. 19, 2011.

* cited by examiner

SUBTERRANEAN RADAR SYSTEM AND METHOD

BACKGROUND

In many instances it can be desired to detect subterranean activity at a remote location. Ground penetrating radar systems can be used to map subterranean regions of the Earth's crust. Generally, the subterranean region is located underground within approximately the upper 10 km of the Earth's crust and may include relatively stationary and non-stationary subterranean formations. Information about these formations may be of particular interest since faults, earthquakes, and fluid migrations at these levels may be more likely to impact structures and life on the surface of the Earth.

Typical ground penetrating radar systems can detect activity directly below the radar installation, by forming a vertical field of regard with respect to the target area. Therefore such systems generally necessitate vertical access through the ground to the subterranean target image areas, as well as access to the above-ground terrain. However, in many circumstances characteristics of the territory prevent vertical or direct above-ground access. For example, vertical access directly above the target area may be challenging due to unstable or impenetrable rock or soil formations. Similarly, excavation of the terrain directly above the target area may be prohibited due to, for example, conservation efforts or inhabitation. Furthermore, access to territory may be forbidden by domestic or international laws.

Some seismic systems and acoustic sensing systems can be used to detect and provide information about relatively large geological formations, such as oil and gas deposits, without the need for vertical or direct above-ground access to the target area. However, these systems are unable to provide the high resolution imaging needed for detailed mapping of the subterranean target area.

SUMMARY

Accordingly, there is a need for systems and methods of imaging a subterranean target area that do not require vertical or direct above-ground access to the subterranean target area. Aspects and embodiments of the present invention are directed to radar systems and methods that use a number of radar units disposed together to form a number radar chains. The radar chains can be placed in predrilled underground columns, which may be located a predetermined, horizontal distance away from the subterranean target area. The radar chains can form a radar array with a horizontal field of regard that encompasses the subterranean target area. By forming a subterranean horizontal field of regard, the radar array can be used to generate images of the subterranean target area without having access to the corresponding above-ground terrain. Images gathered from the subterranean target area may be used for a number of purposes, including detecting the presence of manmade structures, improving the stability of manmade structures such as coal mines or tunnels, long term activity covert monitoring such as detecting underground military equipment movements, planning for methane hydrate formation mining, defining utility pathways, identifying safety issues associated with fissures, fractures, and methane migration paths, tracking subterranean fluid flows, and identifying the locations where gas, oil, water, and mineral deposits are likely to form.

According to one embodiment, a method of imaging a subterranean target area comprises transmitting a radar signal from a first set of a plurality radar units horizontally toward the subterranean target area located a horizontal distance away, the plurality of radar units being disposed in a plurality of underground columns to form a plurality of radar chains, and each radar chain including the plurality of radar units disposed in one of the plurality of underground columns. The method further comprises receiving by a second set of the plurality of radar units, a reflected signal from the subterranean target area, and processing the reflected signal to generate an image of the subterranean target area.

In one example, the method further comprises controlling a dwell time of the radar signal. In another example, controlling the dwell time of the radar signal includes transmitting a continuous radar signal over a period of time. In this example, the method further comprises establishing a stable reference frequency oscillation signal, controlling the radar signal based on the stable reference frequency oscillation signal, and averaging the reflected signal over the period of time. In another example, the method further comprises designating at least one first radar unit of the first set of radar units as a transmitting radar unit, and designating at least one second radar unit of the second set of radar units as a receiving radar unit. In one example, transmitting the radar signal includes transmitting the radar signal at a plurality of frequencies. Transmitting the radar signal at the plurality of frequencies may further include transmitting the radar signal at a frequency range of approximately 10 to 1000 megahertz.

In another example, transmitting the radar signal from the first set of a plurality radar units includes configuring the plurality of radar units in the plurality of radar chains to form a field of regard encompassing the subterranean target area. In one example, processing the reflected signal includes adjusting the image by determining material characteristics of the subterranean target area. In another example, processing the reflected signal further includes interferometrically processing the reflected signal. In a further example, processing the reflected signal further includes integrating a plurality of images of the subterranean target area into a tomographic three-dimensional composite image. In yet another example, processing the reflected signal further includes interactively back-projecting the reflected signal to produce a three-dimensional composite image.

According to another embodiment, a subterranean radar array system comprises a plurality of radar chains disposed in a plurality of underground columns, each radar chain including a plurality of radar units forming the plurality of radar chains, and at least one processor coupled to a corresponding at least one of the plurality of radar chains and configured to generate an image of a subterranean target area from signals received from the at least one radar chain.

In one example, the plurality of radar chains are be positioned to form a field of regard encompassing the subterranean target area. In addition, at least one first radar unit of the plurality of radar units may be designated as a transmitting radar unit, and at least one second radar unit of the plurality of radar units may be designated as a receiving radar unit. In one example, the subterranean radar array system further comprises at least one memory coupled to the corresponding the at least one of the plurality of radar chains for storing the at least one reflected radar signal. In this example, the at least one processor is coupled to the at least one memory and configured to generate the image from the least one reflected radar signal stored in the memory. In another example, each of the plurality of radar units further comprises a radar antenna, a radar transmitter coupled to the radar antenna and configured to transmit a radar signal horizontally toward the subterranean target area, a controller coupled to the radar transmitter configured to control the radar signal to the radar transmitter, and a radar receiver coupled to the radar antenna and configured to receive a reflected radar signal from the subterranean target area. In another example, the radar antenna comprises a dipole radar antenna, including a pair of conductors. The controller may be configured to control a dwell time of the radar signal. In addition, the controller may be configured to control the transmitter to transmit the radar signal at a frequency range of approximately 10 to 1000 megahertz.

Still other aspects, embodiments, and advantages of these exemplary aspects and embodiments, are discussed in detail below. Any embodiment disclosed herein may be combined with any other embodiment in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
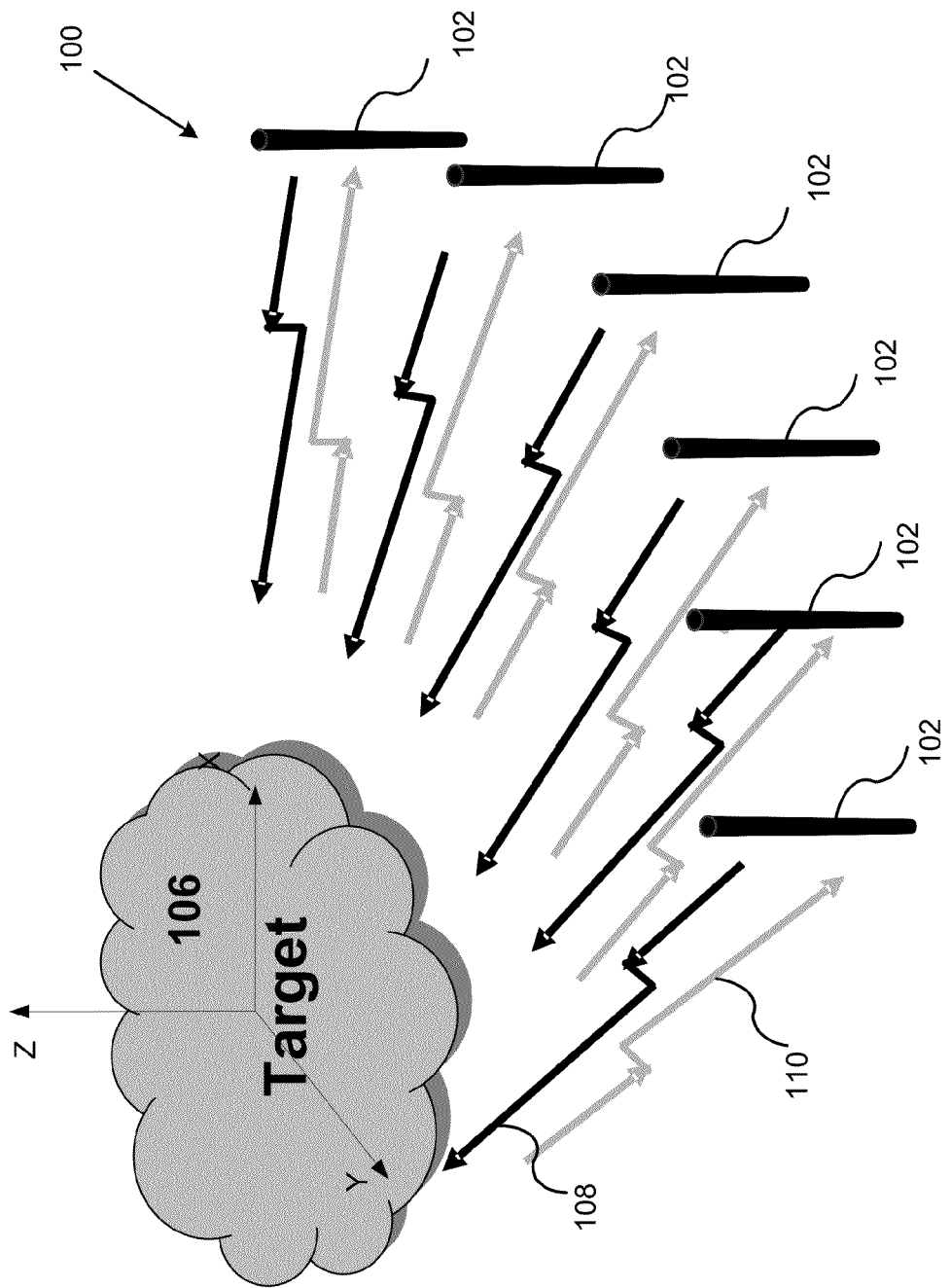
FIG. 1 is a schematic diagram of one example of a subterranean radar system including a subterranean target area, according to aspects of the present invention.

As discussed above, conventional solutions of imaging the subterranean target area require vertical and direct above-ground access to the subterranean target area, which may not be possible. Accordingly, there is a need for a system capable of imaging the subterranean area without having access to the region directly above it. Aspects and embodiments are directed to a system and method of imaging subterranean target areas that overcomes the limitations of conventional methods, while providing a solution that is able to provide imaging results of resolution comparable to conventional solutions.

According to some examples, a radar array comprised of one or more radar chains is used to image a subterranean target area that is located at a horizontal distance from the radar array. Unlike conventional or vertical radar systems, which typically require access to territory directly above-ground, the radar array disclosed herein forms a horizontal radar system generating an underground horizontal field of regard with respect to the target area. Embodiments of the horizontal radar system may allow imaging of the subterranean target area without the need for access to the above-ground territory. Furthermore, by acquiring underground terrain information from seismic maps combined with dielectric modeling, embodiments of the horizontal radar system can provide high resolution images of the target area as comparatively with previously used vertical radar systems.

In one example, the subterranean radar chains are inserted into one or more of the columns predrilled into the earth, which are emplaced using vertical and horizontal directional drilling techniques. As discussed further below, the radar chains are comprised of one or more radar units. The radar units can transmit one or more of the radar signals towards the target area and receive one or more of the reflected signals. Various techniques can be used to selectively control each of the radar units to create optimal look angles with respect to the subterranean target area. The received signals can be processed using various signal processing, image processing, and analytical techniques to produce an image of the subterranean target area, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, and upper and lower are intended for convenience of description, not to limit the present systems and methods or their components to any one positional or spatial orientation.

Referring to FIG. 1, there is illustrated one example of a subterranean radar array system 100. In the illustrated example, a number of radar chains 102 are deployed underground, or at least partially underground, at selected locations relative to a subterranean target area. In the illustrated example, the Z-axis represents vertical ground penetration, and the X and Y axes represent horizontal placement of the radar chains in relation to the subterranean target area. According to examples presented herein, subterranean target areas located at less than about 10 km to 20 km away from the radar chains may be detected and imaged. The number and placement of radar chains 102 may depend on the size of the target area, the apertures of the radar chains and the resolution needed to produce a complete image of the subterranean target area 106, as discussed further below.

The configuration of the radar units in the radar chains define a look angle and form a pre-determined angular relationship with respect to a particular subterranean target area. Each radar chain may be selectively placed to form the desired angular relationship and image a portion of the subterranean target area 106. The angular relationship may have defined azimuth and elevation values. The radar chains 102 form a field of regard that encompasses the subterranean target area 106, which may be formed, in one example, as a three-dimensional segment of the subterranean target area 106. The radar array 100 transmits one or more radar signals 108 toward the target area 106 and receives one or more reflected signals 110 from the target area 106. The reflected signals 110 may be used to generate one or more images of the subterranean target area 106.

The radar array 100 may operate at a relatively low range of frequencies, such as approximately 10 MHz to 1000 MHz, using continuous wavelength signals, wide bandwidth, multiple channels in elevation and azimuth and long repetitious dwell times. As further described below, positioning multiple radar chains around the subterranean target area 106 may allow the use of various imaging and processing techniques such as three-dimensional back-projection methods, model-based focusing, interferometric processing techniques, Doppler processing techniques, tomographic three-dimensional processing techniques, among other methods. These imaging and processing techniques may provide enhanced resolution of the subterranean target area 106. In some examples, the resolution of the subterranean target area may be approximately one foot by one foot by one foot.

Figure 2:
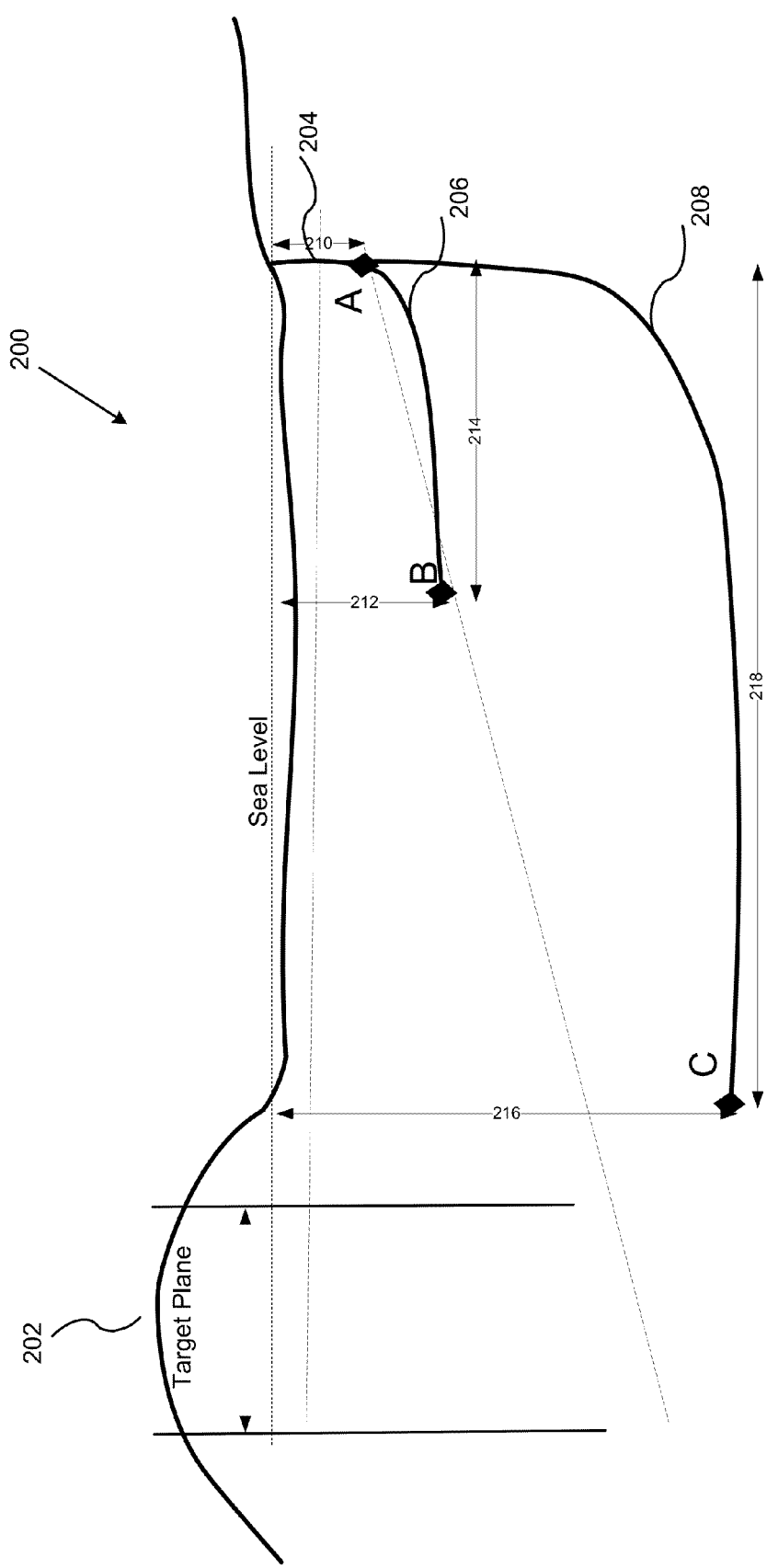
FIG. 2 is a schematic diagram of one example of subterranean terrain including predrilled columns, according to aspects of the present invention.

Referring now to FIG. 2, there is illustrated a schematic diagram of one example of subterranean terrain including a subterranean target area 202. The subterranean radar chains 102 (not shown) are inserted into one or more of the columns 204, 206, and 208 predrilled into the earth to form an array as an in the example shown in FIG. 1. Columns 204, 206 and 208 may be emplaced using vertical and horizontal directional drilling techniques, for example, as commonly used in the oil industry. Predetermined depth values, 210, 212 and 216 may be associated with columns 204, 206 and 208. The depth values can be measured as a vertical distance from a reference level down to a termination point. In one example, the depth values may be about 100 meter to 3000 meters. Predetermined horizontal ground penetration distances 214 and 218, may be associated with columns 204, 206 and 208. The horizontal ground penetration distances or offsets may be measured as a horizontal distance from the initial penetration point to the termination point. In one example, horizontal ground penetration distances may be any distance less than 10 km. As shown in the example of FIG. 2, the reference point for columns 204, 206 and 208 is sea level. The termination point for columns 204, 206 and 208 is labeled A, B and C, respectively.

According to some examples, drilling columns and tunnels at different depths and horizontal ground penetration distances allows for placement of the radar chains around the subterranean target area. The penetration distances and vertical depths of the columns are predetermined to place the radar chains and form a desired angular relationship with the subterranean target area. The desired angular relationship improves determination of target ranges and allows for specific and selective targeting of individual parts of the subterranean target area. For example, radar chain A placed in column A at a predetermined depth and distance may image one portion of the target area and radar array B placed in column B with a different depth and distance may image another portion of the target area. Therefore, a more complete image of the target area may be formed by combining the images produced by both radar chains A and B. Specific and selective targeting of different parts of the target area may produce a more accurate representation of the target area. Forming the radar array as one or more radar chains placed at different depths and distances may allow for further implementation of various transmission techniques, as described further below.

Figure 3:
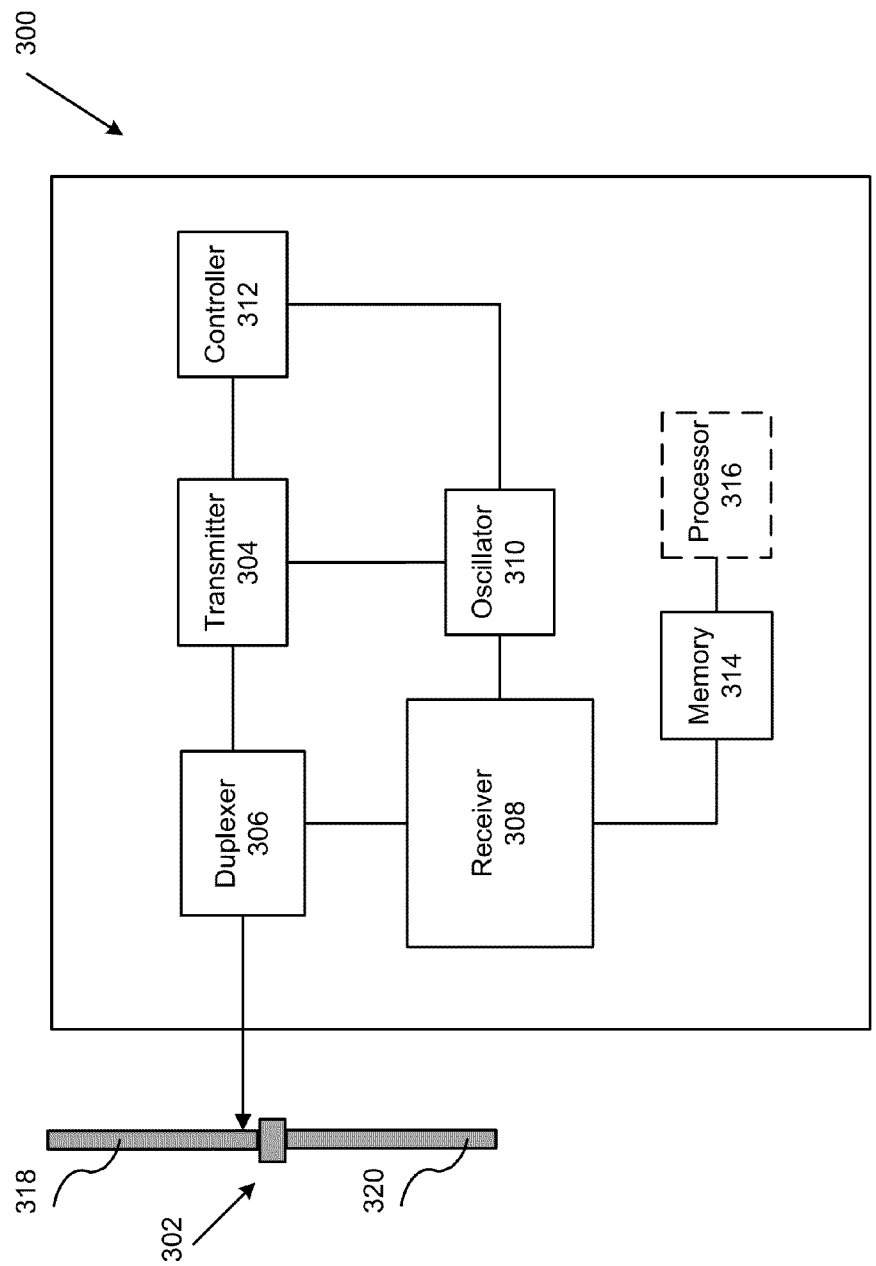
FIG. 3 is a block diagram of one example of a radar unit, according to aspects of the present invention.

Referring now to FIG. 3, there is illustrated a block diagram of one example of a radar unit 300 according to one or more aspects of the present invention. In one example, the radar unit 300 includes an antenna 302, a transmitter 304, a duplexer 306, a receiver 308, a signal generator 310, a controller 312, a memory 314 and a processor 316, each of which is discussed further below.

According to some examples, the antenna 302 is a dipole antenna with two conductors 318 and 320, oriented parallel with each other. However, other types of antennas may be used. In some examples, the transmitter 304 and the receiver 308 are coupled to the antenna 302 through the duplexer 306. The duplexer allows a single antenna to be used for both transmitting and receiving of radar signals. The duplexer switches between receive mode and transmit mode by switching the antenna between the transmitter and receiver. The duplexer further isolates the receiver from transmitter during the transmission pulse.

The oscillator 310 may be configured to generate one or more waveforms at a range of frequencies. For example, the range of frequencies may include a relatively low range of frequencies, such as approximately 10 MHz to 1000 MHz. The controller 314 may be configured to control the oscillator 310 to produce a waveform of a predetermined frequency to feed to the transmitter 304. The transmitted waveforms may be of relatively a wide or broad bandwidth, which may allow for detection of high resolution range information from the return radar signals.

The transmitter 304 may mix the received waveform of baseband frequency from the oscillator 310 with another signal of known frequency to produce a radar signal with a predetermined radio frequency (RF). The baseband waveform may be upconverted to the desired RF frequency range by one or more mixing stages and may be amplified before transmission.

In one example, the transmitter 304 emits short pulse waveform pulses transmitted in sequence. Reflected short pulses can be used for determining the distance to the subterranean target. In another example, the radar signals generated by the transmitter 304 can be continuous waveform (CW) signals transmitted over long dwell times. In one example, dwell time is the time in which the transmitted signal remains focused on the subterranean target area. The transmitter may also generate frequency modulated continuous waveform (FMCW) signals.

According to some examples, the CW and/or FMCW waveforms can be used for continuous transmissions over long dwell times. The dwell time may be controlled by the controller 312 and may include hours or may extend over days and weeks. For example, dwell times up to and exceeding 1000 hours may be suitable for detailed imaging. According to some examples, the return signals are averaged over time to improve the signal-to-interference ratio (SIR), which may facilitate accurate determination of target ranges and may further result in improved imaging of the subterranean target area.

The transmitted radar signal encounters the subterranean target area and is reflected back as a reflected or return signal. The return signals may be averaged over time to improve SIR. Stable frequency oscillation techniques may be employed to hold a stable transmit signal and ensure coherent averaging of the return signal. A stable reference signal may be produced by the oscillator 310 and locked in phase with the transmitting pulse to prevent phase drift of the transmit signal.

In one example, the receiver 308 may further include one or more components designed to receive and process the reflected signal, for example, a low noise amplifier (LNA), a mixer, an intermediate frequency (IF) amplifier, and an analog-to-digital (A/D) converter. The received signal may be downconverted to baseband through one or more mixing stages, each with an intermediate frequency (IF). In one example, the first stage comprises the LNA, which can amplify the received signal to one or more signal levels in order to boost the desired signal power without adding noise and distortion. Stages following the LNA may include one or more mixing stages that may downconvert the amplified signal to one or more lower IF frequencies and to baseband.

The receiving path may include the A/D converter that may convert the received analog signal to a digital signal. The A/D conversion may take place as soon as the signal is received, alternatively, the digitizing can take place after the amplification and modulation stages before the signal is passed to the signal processor. Additional components can be used to provide coherent RF transmission, such as clocks, mixers, frequency synthesizers, as well as other components.

In one example, the downconverted and digitized signal is received by the signal processor, which performs a number of functions to filter and process the reflected signal, including compression, matched filtering, integration, and motion compensation. The output of the signal processor can be stored into memory 314 and/or transmitted to the processor 316.

Figure 4:
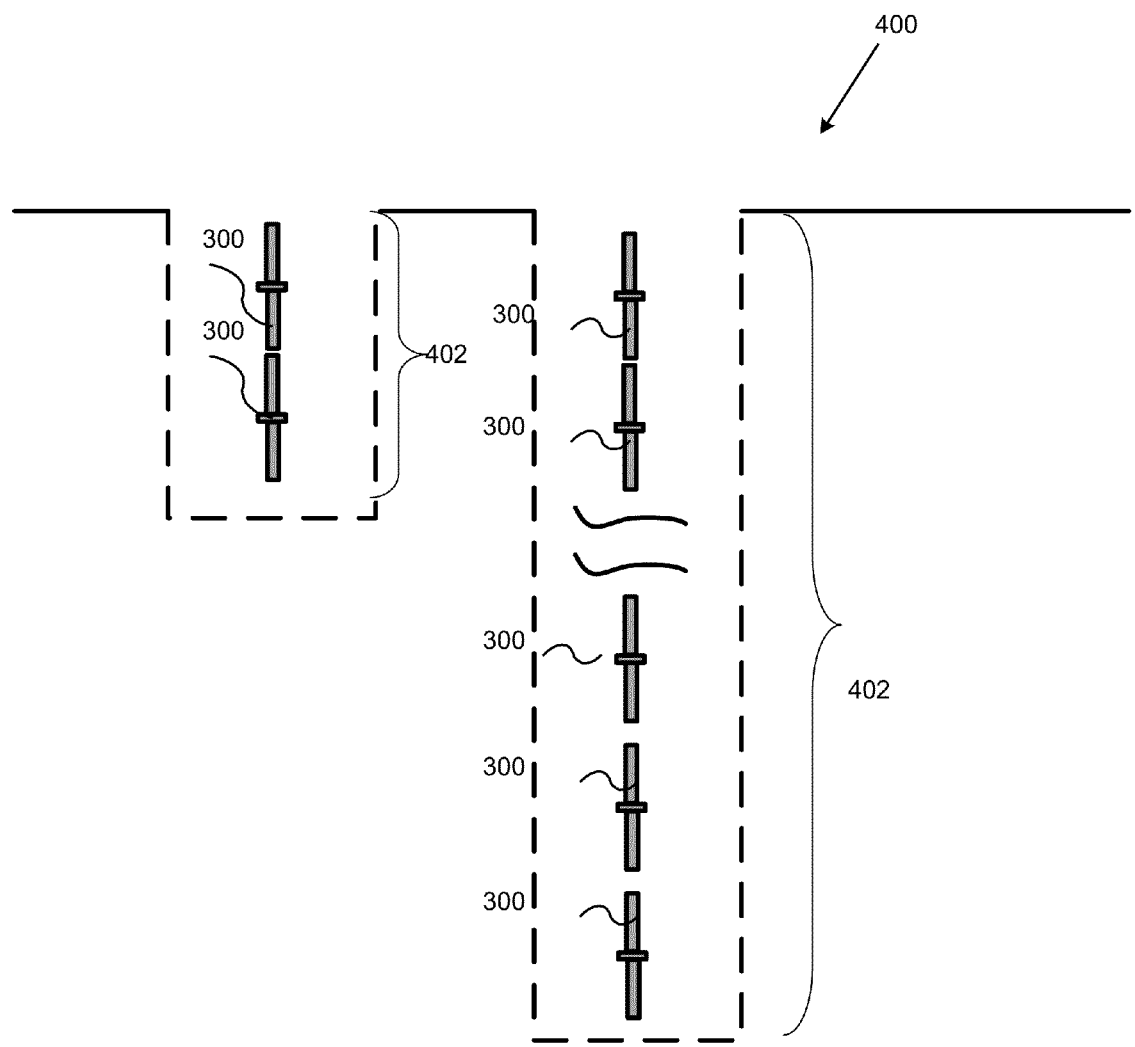
FIG. 4 is a schematic diagram of one example of one or more radar chains, according to aspects of the present invention.

According to some embodiment, the radar units 300 may be inserted into predrilled columns to form one or more radar chains, forming a horizontal radar array. Referring now to FIG. 4, there is illustrated a schematic diagram of one example of a radar array 400 that includes a plurality of radar units 300 forming one or more of radar chains 402 inserted in multiple columns. Radar units 300 in the radar chains 402 may have vertical spatial separation values relative to other radar units in the radar chain. Similarly, radar units in one radar chain can have horizontal spatial separation values relative to other radar units in another radar chain.

These spatial separation values can be used to determine transmission and reception patterns that may define desired look angles for a particular subterranean target area and further allow using various image processing techniques. According to some examples, a synchronized "transmit hopping" method is used to transmit from the radar array 400 and receive reflected signals from the subterranean target area. In one example, different radar units 300 in the radar chains 402 within the radar array 400 can be designated as transmitting radar units and receiving radar units. Furthermore, a different group of radar units may be designated for each transmission. In one example, one radar unit may be selected to transmit for a specific time period before switching to another radar unit. The remaining radar units 300 may be configured to receive the reflected signals.

In one example, a pattern of selecting transmitting radar units 300 can be determined to define optimal look angles. In one example, this pattern can be a function of the vertical and horizontal special separation values of each radar unit. In another example, each radar unit 300 in the radar chains 402 is used sequentially to transmit radar signals before using radar units 300 from the subsequent radar chain 402. Transmit hopping in specific patterns across the radar array 400 can be used to improve depth perception and to create more detailed three dimensional images.

Referring again to FIG. 3, the processor 316 can perform a variety of image generation techniques and analytical methods to generate an image the subterranean target area. Some of these methods and techniques have been described in U.S. Pat. No. 7,898,468, titled Radar Imaging of Buildings Using Model-Based Focusing And Data-Based Focusing (hereinafter '468 patent); U.S. application Ser. No. 12/502,325 titled Interferometric Synthetic Aperture Radar for Imaging of Buildings (hereinafter '325 application); and U.S. application Ser. No. 13/089,720 titled Systems and Methods for Mapping the Crust of the Earth (hereinafter '720 application), which are incorporated by reference herein, in their entireties. Some of the imaging generation techniques described can include three-dimensional back-projection methods and model-based focusing. Analytical methods can include interferometric processing techniques, Doppler processing techniques, and tomographic three-dimensional processing techniques.

The '468 patent describes a system and method of model-based focusing, which refers to adjustment of images by using one or more determined material characteristics that influence the propagation path to the imaged object. The imaged object in the patent '468 is a building and knowledge of material characteristics of the walls of the building may be used to correct aberrations in images generated by a radar system. Similar model-based focusing methods may be applicable to imaging the subterranean target area. Material characteristics, applicable herein, may be any aspects of subterranean target area and surrounding region that influence the propagation path of electro-magnetic radiation used by the radar array. For example, subterranean geological features within the subterranean target area. Knowledge of the material characteristics may be used to correct aberrations in images generated by the radar array. In one example, seismic maps can used to determine material characteristics and improve model-based focusing. This model-based focusing can also help determine specific radar parameters to be used in the radar array.

The '720 application describes three-dimensional back-projection methods which may be used to construct images from multiple radar units in the radar chains. Using model-based focusing, received signals from every radar unit in the radar chains may be back-projected in three-dimensions in an iterative manner until convergence is reached. The combination of the resulting three-dimensional images can be weighted by phase and amplitude statistics formed across the multiple images. This weighting may serve to suppress sidelobes and noise. Three-dimensional back-projection methods can be performed at the same time, or stored and processed at a later time. For example, reflected signals received from each radar unit can be phase-aligned and summed into a three-dimensional image as the signals are received over a period of time. Additional analytical methods can be applied after initial image formation.

According to some examples, analytical methods that are performed on the received signals and may include interferometric processing techniques, Doppler processing techniques, tomographic three-dimensional processing techniques, described in the '720 and '325 applications. Interferometric processing, described in the '325 application, discusses analyzing phase information from reflected signals received by multiple radar arrays from a single object to determine various internal characteristics of the object. In some embodiments, the acquired phase information may be useful for filtering specular reflections of internal features of the object and may enhance the generated imagery.

As further described in '720 application, Doppler processing techniques may be used to identify subterranean movement of fluids and tomographic three-dimensional processing techniques may be used to integrate multiple views of the subterranean target area into a composite image. Over the course of long dwells, the returned "clutter" echoes from the subterranean target area may be analyzed to reveal coherent patterns indicating the presence of structures, voids, or fluid flows.

Figure 5:
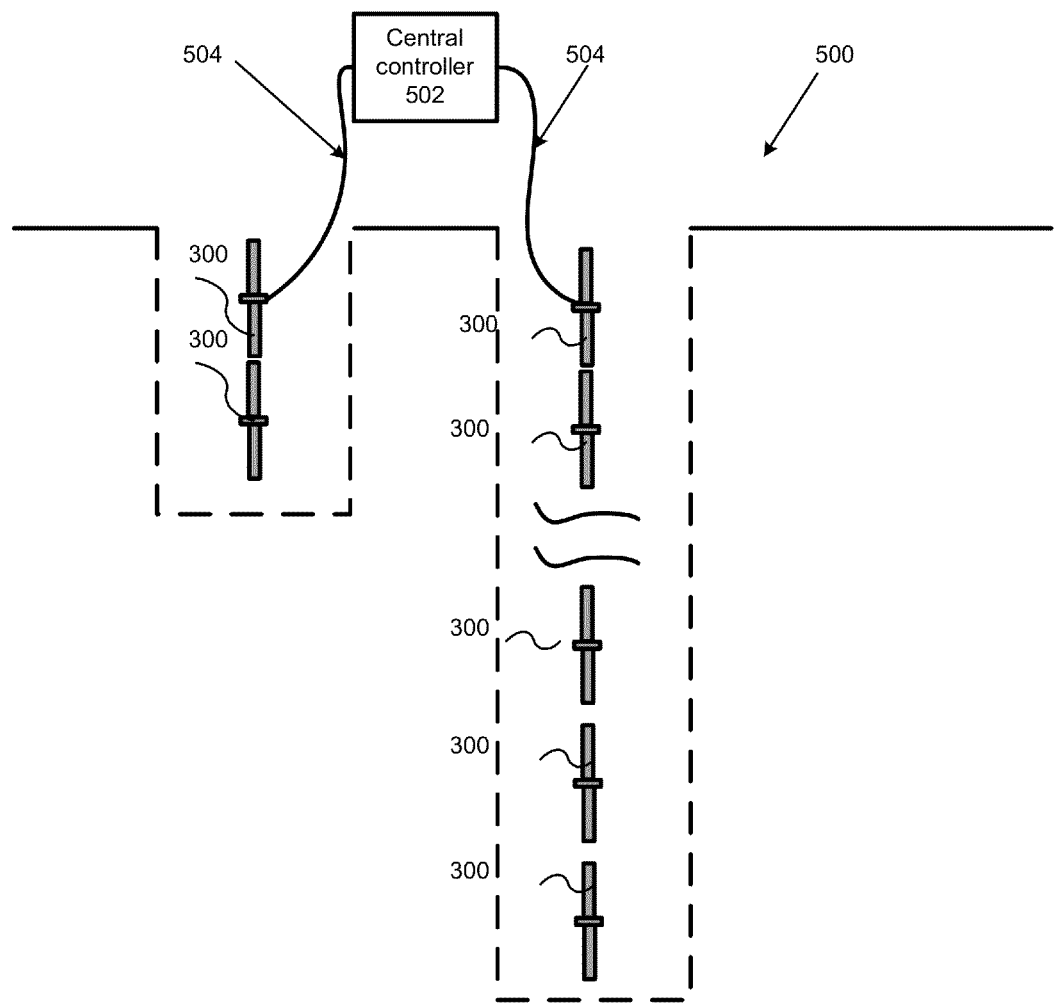
FIG. 5 is a schematic diagram of one example of one or more radar chains connected to a remote controller, according to aspects of the present invention.

In one embodiment, as illustrated in FIG. 5, the processor and/or the controller may be located remotely from the radar unit 300 and may be included as part of a control center 502. The control center 502 may include a master controller, a central memory, and/or a master processor. In at least one example, the radar units 300 are configured to receive instructions from the master controller to transmit signals and process the reflected signals for each individual radar unit 300. In one example, reflected signals received by the radar units 300 can be stored into radar memory and processed by the master processor at a later time. Alternatively, the master controller may transmit instructions to the local controller 312, which is configured to carry out the instructions and control the transmitter accordingly.

The radar array 500 can further include a communication link 504 coupling the control center 502 to the radar units 300. The communication link 504 can be used to send control commands from the control center 502 to the radar unit 300 and/or to send data from the radar unit 300 back to the control center 502. In the depicted embodiment, the communication link 504 may be a physical connection such as a fiber optic cable. In another example, the communication link may be wireless. The communication link 504 may further include a data backhaul system that comprises multiple time shared gigabit fibers to transfer data associated with received signals back to the control center 502.

The memory in the radar unit 300 or in the control center 502 may be used for storing programs and data during operation of the radar unit 300 or one or more of the radar chains. Thus, the memory may be a relatively high performance, volatile, random access memory such as a dynamic random access memory (DRAM) or static memory (SRAM). However, the memory may include a computer readable and writeable nonvolatile (non-transitory) data storage medium in which instructions are stored that define a program or other object that may be executed by the central processor in the control center 502 or processor 316 in the radar unit. The processor and the controller may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. However, the processor and the controller may be specially programmed, special-purpose hardware, such as an application-specific integrated circuit (ASIC) tailored to perform a particular operation disclosed herein.

Figure 6:
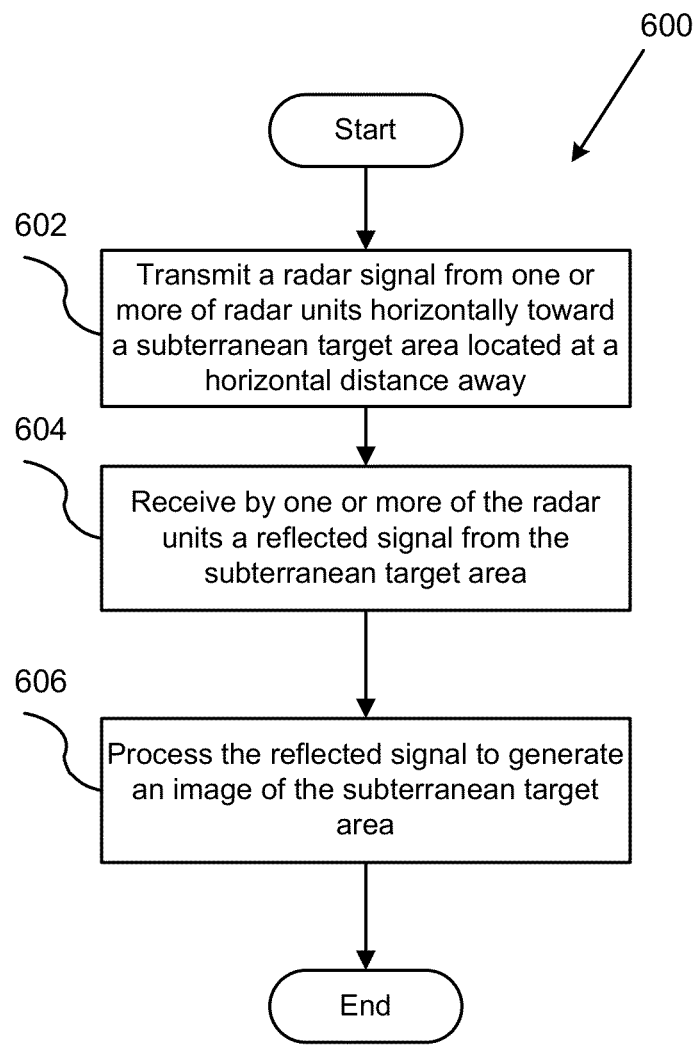
FIG. 6 is a flow diagram of one example of a method of imaging a subterranean target area, according to aspects of the present invention.

A method 600 of imaging a subterranean target area, according to one example, is now described with reference to FIG. 6. The transmitter can be configured to transmit the radar signal via the antenna horizontally toward the subterranean target area (step 602). As described above, long dwell times can be used to for transmitting the radar signal. During these long dwell times, transmit step 602 may be performed one or more times so that data received from the target can be coherently combined together.

The transmitted radar signal encounters the subterranean target area and is reflected back as a reflected or return signal. In step 604, the receiver can be configured to receive the reflected signal via the antenna from the subterranean target area. The received signals can be amplified, modulated, filtered and converted using various signal processing techniques. In step 606, the signals gathered from the receiver over the course of the long dwell times are processed to produce images of subterranean target area. Some of these imaging processing techniques can include three-dimensional back-projection methods and model-based focusing. The generated images can be further analyzed, for example using interferometric processing techniques, Doppler processing techniques, and tomographic three-dimensional processing techniques.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of imaging a subterranean target area, the method comprising:
   transmitting a radar signal horizontally toward the subterranean target area from a first sub-set of a plurality radar units, the plurality of radar units being arranged to form a plurality of radar chains that are individually disposed in respective ones of a plurality of underground columns, each radar chain including at least two of the plurality of radar units vertically spaced apart from one another within the respective underground column, wherein the plurality of radar chains are horizontally spaced apart from one another and located at least a minimum horizontal distance away from the subterranean target area;
   receiving by a second sub-set of the plurality of radar units, a reflected signal from the subterranean target area; and
   processing the reflected signal to generate an image of the subterranean target area.

2. The method of claim 1, wherein transmitting the radar signal includes: transmitting continuous wave (CW) radar signal for a selected dwell time.

3. The method of claim 2, further comprising:
   producing a stable reference frequency oscillation signal;
   phase-locking the radar signal with the stable reference frequency oscillation signal; and
   averaging the reflected signal over the dwell time.

4. The method of claim 1, wherein transmitting the radar signal further comprises transmitting the radar signal at a plurality of frequencies.

5. The method of claim 4, wherein transmitting the radar signal at the plurality of frequencies further comprises transmitting the radar signal at a frequency range of approximately 10 to 1000 megahertz.

6. The method of claim 1, wherein processing the reflected signal further comprises adjusting the image by determining material characteristics of the subterranean target area.

7. The method of claim 1, wherein processing the reflected signal further comprises interferometrically processing the reflected signal.

8. The method of claim 1, wherein processing the reflected signal further comprises integrating a plurality of images of the subterranean target area into a tomographic three-dimensional composite image.

9. The method of claim 1, wherein processing the reflected signal further comprises interactively back-projecting, the reflected signal to produce a three-dimensional composite image.

10. A subterranean radar array system comprising:
a plurality of radar chains, each radar chain disposed in a respective one of a corresponding plurality of underground columns that are horizontally spaced apart from one another, each radar chain including a plurality of radar units vertically spaced apart from one another within the respective underground column, wherein at least one radar chain is configured to horizontally transmit a radar signal; and
a controller coupled to the plurality of radar chains and configured to generate an image of a subterranean target area from reflections of the radar signal received by at least one radar chain of the plurality of radar chains.

11. The system of claim 10, wherein the plurality of radar chains are positioned with respect to one another to form a field of regard encompassing the subterranean target area.

12. The system of claim 10, wherein, for each of the plurality of radar chains, at least one first radar unit of the plurality of radar units is configured to transmit the radar signal, and at least one second radar unit of the plurality of radar units is configured to receive the reflections of the radar signal.

13. The system of claim 10, wherein each of the plurality of radar units further comprises:
a radar antenna:
a radar transmitter coupled to the radar antenna and configured to transmit the radar signal horizontally toward the subterranean target area; and
a radar receiver coupled to the radar antenna and configured to receive the reflections of the radar signal from the subterranean target area.

14. The system of claim 13, wherein the radar antenna comprises a dipole radar antenna, including a pair of conductors.

15. The system of claim 10, wherein the controller is configured to control a dwell time of the radar signal.

16. The system of claim 10, wherein the radar signal has a frequency range of approximately 10 to 1000 megahertz.

* * * * *